Patented Apr. 12, 1938

2,113,567

UNITED STATES PATENT OFFICE 2,113,567

ARYL MERCURY OXYGENATED COMPOUNDS OF ARSENIC, ANTIMONY, OR BISMUTH

Carl N. Andersen, Wellesley Hills, Mass., assignor to Lever Brothers Company, a corporation of Maine No Drawing. Application September 28, 1936, Serial No. 102,983

15 Claims. (Cl. 260—13)

The present invention relates to certain new organic mercury compounds, and more particularly to aromatic mercury salts and alcoholates of compounds containing arsenic, antimony or bismuth.

It is an object of my invention to produce organic mercury compounds of the above type which are useful as germicides and for other therapeutic purposes.

I have discovered that when a hydrogen atom that is linked through oxygen in a compound containing arsenic, antimony or bismuth is replaced by the essential radical of certain aromatic mercury compounds, compounds are produced which have extraordinarily high potency as antiseptics and germicides, and at the same time, in most instances, are characterized by relatively low toxicity and other desirable properties. Aromatic mercury compounds of the above type have been prepared from a sufficiently representative number of arsenic, antimony and bismuth containing compounds of the kind indicated, to show that all of these compounds can be employed to produce my aromatic mercury compounds, and the compounds so prepared have in greater or lesser, but always in a relatively high degree, desirable antiseptic and germicidal properties.

The compounds constituting the subject matter of the present invention may be described as having the general formula $(RHg)_x.R_1$, in which R represents an aromatic structure to a carbon atom of which the mercury is directly attached; in which $R_1$ represents the radical of a compound containing one or more of the elements arsenic, antimony and bismuth, and containing at least one hydrogen atom linked through oxygen, which radical is linked to the RHg group or groups through the replacement of the hydrogen atom or atoms; and in which $x$ represents the number of RHg groups in the compound and is an integer of at least one and not more than the number of replaceable hydrogen atoms. While the words "group" and "groups" are used hereafter, they must be interpreted as singular or plural, depending upon the value of $x$.

More particularly, R represents an aromatic structure, which may be an aromatic nucleus with or without side chains, and the expression "aromatic structure" used herein is intended to be generic and to include an aromatic nucleus with or without side chains. The aromatic structure is of the type in which none of the nuclear or side chain carbon atoms has direct linkage with any element other than hydrogen, carbon or mercury. R may stand for any mono or polycyclic hydrocarbon group in which all of the nuclear carbon atoms, other than the one attached to mercury, and any side chain carbon atoms, have their valences satisfied either by carbon or hydrogen. Examples are phenyl, diphenyl, tolyl, xylyl, and naphthyl groups.

$R_1$ represents the radical of any compound containing one or more of the elements arsenic, antimony and bismuth and a hydrogen atom linked through oxygen. The metals arsenic, antimony and bismuth fall in the same periodic group (Vb) and are discussed by text writers as falling in a common family. The compounds may be either inorganic or organic and the latter may be aliphatic or cyclic; they may contain any number of replaceable hydrogen atoms. The replaceable hydrogen is connected to an oxygen atom the other bond of which may be connected directly to a metal of the group Vb or may be connected to a carbon atom of an organic group containing a metal of the group Vb. The second class may be further subdivided into a subgroup in which the group Vb metal is directly connected to a carbon atom of the organic group, and into the subgroup in which the group Vb metal is connected to a carbon atom of the organic group through oxygen. The replaceable hydrogen atom usually exists in a basic or acidic compound and the group which contains the hydrogen atom is generally designated as a basic or acidic group. The basic compounds contain the replaceable hydrogen atom in the OH group. The acidic compounds may also contain the replaceable hydrogen in an OH group and also acidic groups, such as COOH and $SO_3H$ groups. The compounds may contain both basic and acidic groups, for example, hydroxy acids. Some of the replaceable hydrogen atoms in the compound, both in acidic and/or basic groups, may be replaced by positive radicals other than an aromatic mercury radical, and the compounds may contain other metals, for examples, the alkali metals sodium and potassium.

Examples of compounds of the above defined type include the simple arsenic containing acids, for example, ortho, pyro, and meta arsenous and arsenic acids, the arsonic and arsinic acids, as well as the corresponding compounds of antimony and bismuth. It may be observed that although in some instances compounds are termed acids, nevertheless some of them are in fact amphoteric and may react both as bases and as acids, and some may react only as bases. Other examples are arsanilic acid, its hydrochloride, and the mono-sodium salt thereof; diamino-dihydroxy arsenobenzene dihydrochloride (Salvarsan), sodium diamino - dihydroxy - arsenobenzene-methanal-sulfoxylate (Neo Salvarsan), acetylamino hydroxy phenyl arsonic acid and the monosodium salt thereof. Other compounds include bismuth sub nitrate, bismuth salicylate, bismuth tartrate, p-sulphomethylaminophenylarsinic acid, s-hydroxy-1:5-benzarsinic acid (salicyl-4-arsinic acid), p - arsenophenyl - N - methylglycine (II.), bismuth tannate, bismuth ammonium citrate, bismuth lactate, and antimony potassium tartrate.

The general method of producing these aromatic mercury compounds consists in reacting together the compound containing a metal of the group Vb and a hydrogen atom linked through oxygen, with a compound containing an aromatic mercury radical of the above defined type. A liquid reacting medium is generally employed. The compound resulting from the reaction is usually relatively insoluble as compared with the reacting components and upon its precipitation may be filtered, washed and dried. The aromatic mercury compound I prefer is the hydroxide, because in the reaction with the hydroxide, water is the only other product formed, and the resulting aromatic mercury compound may be easily purified. My novel compounds may also be prepared by employing other aromatic mercury compounds, for example, a soluble salt such as the acetate or lactate, in a reaction with the arsenic, antimony or bismuth containing compound. The aromatic mercury compounds formed during the reaction are of relatively low solubility as compared with either of the reacting components and therefore may be easily separated. Either of these general methods may be employed in producing the compounds comprising this invention.

The reacting materials are usually employed in substantially theoretical quantities, but in some instances, a slight excess of the arsenic, antimony or bismuth containing compound may be employed in order to insure complete conversion of the aromatic mercury compound. This however is not essential.

In compounds which contain more than one replaceable hydrogen atom, one or more, including all of them may be replaced by the same or different aromatic mercury radicals, and one or more may be replaced by other positive radicals, for example, an alkali metal, along with one or more of the same or different aromatic mercury radicals. For example, if the compound contains one OH and one COOH group, both may be replaced by the same or different aromatic mercury radicals; the carboxyl hydrogen alone may be replaced by an aromatic mercury radical or the carboxyl hydrogen may be replaced by metal, for example, sodium, potassium, arsenic, antimony or bismuth, and the hydrogen of the OH group may be replaced by the aromatic mercury radical. If the compound contains two or more acidic groups or basic groups the hydrogen of all the groups may be replaced by the same or different aromatic mercury radicals to form a neutral salt or alcoholate. Less than all of the hydrogens may be replaced. In the case of an acid, the resulting compound will be an acid salt. Similarly one or more of the hydrogens may be replaced by an aromatic mercury radical and the remaining hydrogens by a metal or other positive radical to form a mixed salt or alcoholate.

The number of hydrogens to be replaced, and the radicals by which they are replaced, will depend on the reacting components and the relative amounts of the same.

The reaction may be carried out in any inert liquid medium, inasmuch as its only function is to bring the reacting components together. Water is convenient to use because of its availability; other solvents are equally as satisfactory, such as the alcohols of low molecular weight, acetone benzol, and other organic solvents or mixtures of these with each other or with water. The process may be carried out at any temperature, for example, room temperature, and the reaction is not dependent upon the use of an elevated temperature. In most cases I find, however, that the use of heat facilitates the solution of the components and permits the use of solutions of greater concentration.

The following specific examples are given as illustrative of methods of preparation and of compounds of the generic class heretofore described as constituting my invention:

*Example I*

8.82 grams of phenylmercury hydroxide is dissolved in 2 liters of water by heating to boiling. The solution is then filtered to remove any gums or insoluble material. To the filtrate is added an aqueous solution containing 2.52 grams of arsenic pentoxide. The resulting mixture is heated to boiling, then allowed to stand until precipitation is complete. Precipitation begins immediately. The precipitate is separated by filtration, washed thoroughly with warm water and dried at 110° C. The resulting product is a white crystalline powder which is sparingly soluble in water. It has a melting point above 270° C., and is the compound triphenylmercury arsenate.

The diphenyl mercury arsenate may be prepared in a similar manner by employing 5.88 grams of phenylmercury hydroxide.

The same compound may be prepared by dissolving 5.88 grams of phenylmercury hydroxide in 1 liter of alcohol at room temperature. The solution is agitated to facilitate solution. In a separate container 2.52 grams of arsenic pentoxide is suspended in one-half liter of alcohol and added to the phenylmercury hydroxide solution. The mixture is filtered and then allowed to stand. A precipitate settles out which is separated by filtration, washed with alcohol and dried.

*Example II*

17.64 grams of phenylmercury hydroxide is dissolved in 4 liters of water. The solution is filtered and to the filtrate is added 7.16 grams of arsanilic acid in aqueous solution. The mixture is brought to boiling and then allowed to stand and cool until precipitation is complete. The precipitate is then separated by filtration, washed thoroughly with water and dried. The resulting product is a white crystalline substance, sparingly soluble in water. It melts above 270° C., and is the compound diphenylmercury arsanilate.

The acid salt or monophenylmercury arsanilate may be prepared in a similar manner by employing 8.82 grams of phenylmercury hydroxide.

Phenylmercury sodium arsanilate may be prepared by employing 1.2 grams of sodium hydroxide and 8.82 grams of phenylmercury hydroxide in the reaction with the arsanilic acid.

Diphenylmercury arsanilate hydrochloride may be prepared in a similar manner by employing 6.9 grams of arsanilic acid hydrochloride with 17.64 grams of phenylmercury hydroxide.

*Example III*

8.8 grams of phenylmercury hydroxide is dissolved in 1 liter of alcohol and heated to facilitate solution. The solution is filtered to remove any insoluble material. To the filtrate is added 200 cc. of alcohol containing 6.5 grams of diamino-dihydroxy arsenobenzene dihydrochloride (Salvarsan). The solution is concentrated to a small volume and brownish-black crystals separate. The product is recrystallized from alcohol and upon heating, remains unchanged up to 270° C. In the reaction it is believed that the hydrogens of both hydroxy groups are replaced by the phenylmercury radical.

*Example IV*

11.76 grams of phenylmercury hydroxide is dissolved in 1 liter of water and heated to facilitate solution. The solution is filtered to remove any insoluble material. To the filtrate is added 9.32 grams of sodium 3,3'-diamino-4,4'-dihydroxy-arsenobenzene-n-monomethanal-sulfoxylate in solid form and the solution becomes muddy. The solution is heated for a short time and filtered. It is concentrated to one-half its original volume and a gummy, semi-crystalline material separates. This is recrystallized from alcohol and has a melting point of 125–126° C. In this reaction the hydrogen in the hydroxy groups is believed to be replaced by the phenylmercury radical.

*Example V*

16.56 grams of acetylamino hydroxyphenyl arsonic acid (Stovarsol) is dissolved in 500 cc. of methyl alcohol and heated to facilitate solution. To the solution is added an aqueous solution of 35.28 grams of phenylmercury hydroxide. A voluminous precipitate forms which is separated by filtration, washed well with water and dried. It is recrystallized from alcohol. Upon heating the material it softens at 130° C., fuses at 141–142° C. and upon further heating decomposes. It is the compound diphenylmercury acetylamino oxyphenyl arsonate.

The sodium phenylmercury acetylamino oxyphenyl arsonate may be prepared in a similar manner by employing 2.4 grams of sodium hydroxide and 17.64 grams of phenylmercury hydroxide. It decomposes at 270° C.

*Example VI*

10.08 grams of phenylmercury acetate is dissolved in 500 cc. of water and heated to facilitate solution. The solution is filtered to remove any insoluble material. To the filtrate is added 17.44 grams of bismuth salicylate in 500 cc. of alcohol. The solution is filtered, evaporated to one half its volume and allowed to cool. A crystalline material separates which is removed by filtration, washed and dried. It melts at 153–155° C. and is the triphenylmercury alcoholate of bismuth salicylate.

*Example VII*

17.64 grams of phenylmercury hydroxide is added to 1 liter of alcohol and heated to facilitate solution. The solution is filtered to remove any insoluble material. To the filtrate is added 24.9 grams of bismuth ammonium citrate, dissolved in 500 cc. of alcohol. The addition produces a milky solution and a precipitate settles out. This is removed by filtration, washed with alcohol and dried. Upon heating the material, it turns gray at 215° C. and blackens at 255–260° C. It is the phenylmercury alcoholate of bismuth ammonium citrate.

*Example VIII*

17.64 grams of phenylmercury hydroxide is added to 1 liter of water and heated to facilitate solution. The solution is filtered to remove any insoluble material and to the filtrate is added 5.2 grams of bismuth hydroxide suspended in 1000 cc. of water. The mixture is heated and filtered hot and set aside to cool. A small quantity of crystals form and upon concentration of the mother liquor, a large yield of crystals is obtained. The crystals are removed by filtration, washed with water and alcohol and dried. The product does not melt when heated up to 240° C.; it is the compound triphenylmercury bismuthate.

*Example IX*

58.8 grams of phenylmercury hydroxide is added to 2 liters of water and heated to facilitate solution. The solution is filtered. To the filtrate is added 1 liter of water containing 16.2 grams of antimony pentoxide. The solution is heated to speed the reaction and then filtered. A straw-yellow crystalline mass separates which is removed by filtration, washed with water and then with alcohol and dried. Upon heating the material it begins to decompose at 150° C. It is the compound tetraphenylmercury pyroantimonate.

The disodium diphenylmercury pyroantimonate may similarly be prepared by employing 29.4 grams of phenylmercury hydroxide and 8 grams of sodium hydroxide. The product sinters and melts at 225° C.

*Example X*

17.64 grams of phenylmercury hydroxide is dissolved in 1 liter of water and heated to facilitate solution. The solution is then filtered to remove any insoluble material. To the filtrate is added 100 cc. of water containing 19.22 grams of antimony potassium tartrate (tartar emetic). A white precipitate results immediately upon the addition; the precipitate is separated by filtration, washed and dried. The product is recrystallized from alcohol. Upon heating the product it does not melt up to 280° C., but decomposition begins at this temperature. It is the phenylmercury alcoholate of antimony potassium tartrate.

*Example XI*

17.64 grams of phenylmercury hydroxide is added to 1 liter of alcohol and heated to facilitate solution. The solution is filtered and to the filtrate is added 21.16 grams of bismuth lactate suspended in 500 cc. of alcohol. The mixture is heated to speed the reaction and upon cooling, an abundant precipitate settles which is removed by filtration, washed with alcohol and dried. On heating the material it darkens at 185° C. and blackens at 230–235° C.; it is the phenylmercury alcoholate of bismuth lactate.

The phenylmercury alcoholate of bismuth tannate may be prepared in a similar manner by employing 44.1 grams of phenylmercury hydroxide and 11.83 grams of bismuth tannate. It melts at 171–172° C., with decomposition.

The phenylmercury alcoholate of bismuth tartrate may be prepared in a similar manner by employing 52.92 grams of phenylmercury hydroxide and 58.20 grams of bismuth tartrate. The product decomposes at 198–201° C.

The compounds of the type above described are characterized by highly satisfactory antiseptic and germicidal properties. Tests to determine the efficacy of some of them in killing *B. typhosus* and *Staph. aureus* were carried on under the following conditions:

Aqueous solutions of varying dilutions from 1:10,000 upward until killing ceased were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° and F. D. A. special method against *Staph. aureus* at 37° C.

The maximum dilutions at which killing in 15 minutes resulted are given below:

|  | B. typhosus | Staph. aureus |
|---|---|---|
| Phenylmercury arsenate | 1:100,000 | 1:40,000 |
| Phenylmercury arsanilate | 1:100,000 | 1:35,000 |
| Phenylmercury arsanilic acid hydrochloride | 1:120,000 | 1:35,000 |

These compounds are characterized by relatively low toxicity. In fact, in some instances they may be administered internally with satisfactory results from the germicidal standpoint and without harmful effects, and may be injected intravenously.

These new compounds may be used directly as germicides in aqueous or other solutions, or may be formed into various preparations, such as mouth washes, tooth pastes, soaps, etc.

Although the invention has been described in particular with reference to certain compounds, these compounds are given merely as illustrative and not as limiting the scope of my invention. I intend my invention to include all compounds of the type described in the appended claims.

This application is a continuation in part of my application Serial No. 694,206, filed October 18, 1933.

I claim:

1. An aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of a compound containing a metal of the periodic group Vb and at least one replaceable hydrogen atom linked through oxygen, which radical is attached to the RHg group by replacement of said hydrogen; and in which $x$ represents the number of RHg groups in the compound and is an integer of at least one and not more than the number of said replaceable hydrogen atoms.

2. An aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of a compound containing a metal of the periodic group Vb and at least one OH group, which radical is attached to the RHg group by replacement of the hydrogen of the OH group; and in which $x$ represents the number of RHg groups in the compound and is an integer of at least one and not more than the number of the OH groups.

3. An aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of a compound containing a metal of the periodic group Vb and at least one acidic group, which radical is attached to the RHg group by replacement of acidic hydrogen; and in which $x$ represents the number of RHg groups in the compound and is an integer of at least one and not more than the number of the acidic hydrogen atoms.

4. An aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of an arsenic containing acid having a replaceable acidic hydrogen linked through oxygen, which radical is attached to the RHg group by replacement of said acidic hydrogen; and in which $x$ represents the number of RHg groups in the compound and is an integer of at least one and not more than the number of the acidic hydrogen atoms.

5. An aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of a bismuth salt of a hydroxy acid, which radical is attached to the RHg group by replacement of the hydrogen of the hydroxy group; and in which $x$ represents the number of RHg groups in the compound and is an integer of at least one and not more than the number of the hydroxy groups.

6. An aromatic mercury compound of the general formula $(RHg)_x.R_1$, in which R represents an aromatic structure to a carbon atom of which the mercury is directly attached and in which none of the carbon atoms has direct linkage with any element other than hydrogen, carbon and mercury; in which $R_1$ represents the radical of an amino hydroxy substituted arsenobenzene, which radical is attached to the RHg group by replacement of the hydrogen of the hydroxy group; and in which $x$ represents the number of RHg groups in the compound and is an integer of at least one and not more than the number of the hydroxy groups.

7. An aromatic mercury compound of the general formula $(C_6H_5Hg)_x.R_1$, in which $R_1$ represents the radical of a compound containing a metal of the periodic group Vb and at least one replaceable hydrogen atom linked through oxygen, which radical is attached to the $C_6H_5Hg$ group by replacement of said hydrogen; and in which $x$ represents the number of $C_6H_5Hg$ groups in the compound and is an integer of at least one and not more than the number of said replaceable hydrogen atoms.

8. An aromatic mercury compound of the general formula $(C_6H_5Hg)_x.R_1$, in which $R_1$ represents the radical of a compound containing a metal of the periodic group Vb and at least one OH group, which radical is attached to the $C_6H_5Hg$ group by replacement of the hydrogen of the OH group; and in which $x$ represents the number of $C_6H_5Hg$ groups in the compound and is an integer of at least one and not more than the number of the OH groups.

9. An aromatic mercury compound of the general formula $(C_6H_5Hg)_x.R_1$, in which $R_1$ represents the radical of a compound containing a metal of the periodic group Vb and at least one acidic group, which radical is attached to the $C_6H_5Hg$ group by replacement of acidic hydrogen; and in which $x$ represents the number of $C_6H_5Hg$ groups in the compound and is an integer of at least one and not more than the number of the acidic hydrogen atoms.

10. An aromatic mercury compound of the general formula $(C_6H_5Hg)_x.R_1$, in which $R_1$ represents the radical of an arsenic containing acid having a replaceable acidic hydrogen linked through oxygen, which radical is attached to the $C_6H_5Hg$ group by replacement of said acidic hydrogen; and in which $x$ represents the number of $C_6H_5Hg$ groups in the compound and is an integer of at least one and not more than the number of the acidic hydrogen atoms.

11. An aromatic mercury compound of the general formula $(C_6H_5Hg)_x.R_1$, in which $R_1$ represents the radical of a bismuth salt of a hydroxy acid, which radical is attached to the $C_6H_5Hg$ group by replacement of the hydrogen of the hydroxy group; and in which $x$ represents the number of $C_6H_5Hg$ groups in the compound and is an integer of at least one and not more than the number of the hydroxy groups.

12. An aromatic mercury compound of the general formula $(C_6H_5Hg)_x.R_1$, in which $R_1$ represents the radical of an amino hydroxy substituted arsenobenzene, which radical is attached to the $C_6H_5Hg$ group by replacement of the hydrogen of the hydroxy group; and in which $x$ represents the number of $C_6H_5Hg$ groups in the compound and is an integer of at least one and not more than the number of the hydroxy groups.

13. A phenylmercury arsanilate.

14. A phenylmercury alcoholate of sodium 3,3'-diamino-4,4'-dihydroxy-arsenobenzene-n-monomethanal-sulfoxylate.

15. A phenylmercury alcoholate of bismuth lactate.

CARL N. ANDERSEN.